United States Patent [19]

Höhn

[11] Patent Number: 4,605,258

[45] Date of Patent: Aug. 12, 1986

[54] VEHICLE, ESPECIALLY CAMPING VEHICLE

[76] Inventor: Roland Höhn, Lipfersbergerstr. 20, D-7118 Ingelfingen, Fed. Rep. of Germany

[21] Appl. No.: 615,698

[22] Filed: May 29, 1984

Related U.S. Application Data

[63] Continuation of Ser. No. 249,712, Mar. 31, 1981, Pat. No. 4,458,939.

[51] Int. Cl.⁴ .............................................. B60P 3/32
[52] U.S. Cl. ........................................ 296/164; 296/25
[58] Field of Search ............... 296/164, 156, 166, 167, 296/175, 25, 14

[56] References Cited

U.S. PATENT DOCUMENTS 1,428,748 9/1922 Brososky .................... 296/25
3,165,350 1/1965 Wilson ....................... 296/156
3,297,355 1/1967 Robinson .................... 296/166

FOREIGN PATENT DOCUMENTS 227065 1/1925 United Kingdom ............ 296/25

Primary Examiner—Robert R. Song

Attorney, Agent, or Firm—Andrus, Sceales, Starke & Sawall

[57] ABSTRACT

A pick-up truck has a cab with a back wall located between the front and rear wheels of the truck. The cab floor is in a horizontal plane with seats secured to the floor. A load platform is located behind the cab and extends back from the cab over the rear wheels and is substantially above the level of said cab floor. An opening is located in the platform immediately adjacent the cab and extends rearwardly therefrom. A camping addition unit is releasably fastened on the load platform. The camping addition unit includes an opening aligned with the platform opening. The tub-like depression is located in the opening with an addition floor located in the same horizontal plane as the cab floor and with sidewalls which extends upwardly to the platform. The addition floor forms an increased height for standing in the interior of the addition means and defines a living space in the area of the platform opening as a rearward extension of the space in the cab. The cab has an opening in the back wall aligned with the tub-like depression such that a substantially continuous living space is provided with a single level floor in the continuous living space. The tub-like depression is located between the cab and the rear wheels of the motor vehicle.

2 Claims, 4 Drawing Figures

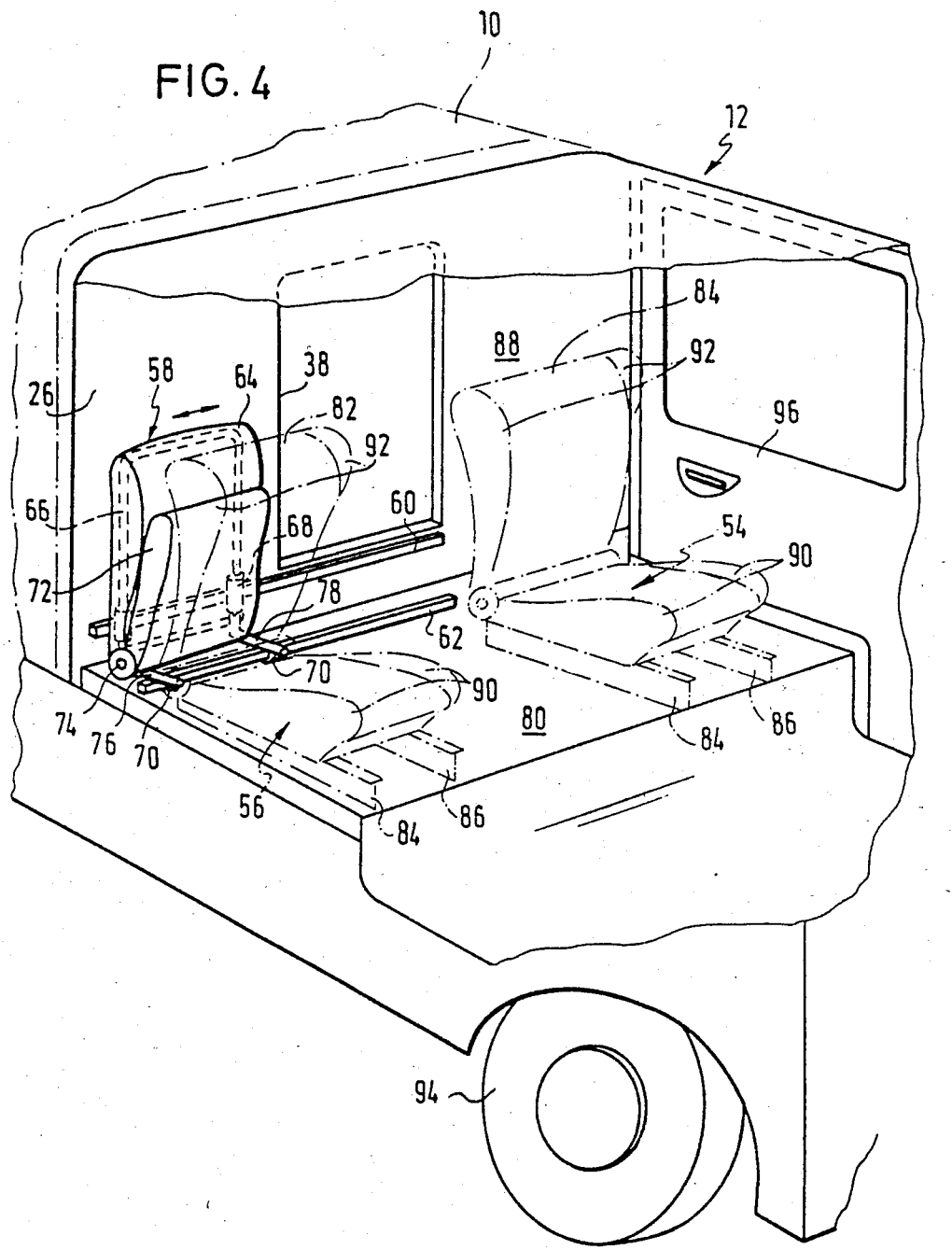

VEHICLE, ESPECIALLY CAMPING VEHICLE

This is a continuation of application Ser. No. 249,712 filed Mar. 31, 1981, now U.S. Pat. No. 4,458,939.

DESCRIPTION

BACKGROUND OF THE INVENTION

The invention relates to a motor vehicle, especially a camper with a cab and a living space and a passageway from cab to living space.

The formation of the living space in the form of so called "pick-up mountings" for mounting on a pick-up vehicle is known and is especially popular in the United States. The camping mountings are known and are, however, very limited in their spaciousness and are consequently uncomfortable, or they are so large that they either extend beyond the roof of the cab as well as beyond the rear length of the vehicle. The latter constructions make the vehicle extremely subject to wind forces and because of the heavy weight very difficult to maneuver. Furthermore, the latter construction requires a lot of material since it is very voluminous. The manoeuvrability is further greatly reduced because of the height of the construction which elevates the center of gravity of the vehicle. Finally, the wind resistance is relatively high because of the height of the construction, which has the result that the fuel consumption increases correspondingly.

Therefore, this invention has the object to create a pick up mounting, which is easily installed and which inspite of reduced dimensions either does not extend or barely extends beyond the dimensions of the vehicle while including a living space with a large interior volume, especially an area with standing room height.

This objective is surprisingly accomplished in the simple manner by forming the living space by a camping addition which is fastened on the loading area of the motor vehicle and which has a recess in its bottom which matches a corresponding recess in the loading surface of the motor vehicle when the addition is mounted immediately adjacent to the cab and forms a tub-like depression in the area of the recess having a large clear height (standing height) in the interior of the addition, that is the living space.

The crux of the invention is the fact that the interior space of the camping mounting or addition which forms the living space is enlarged "downward". This eliminates the requirement of a so called "upper roof" which is relatively demanding in its construction as well as in its handling. Of course, this does not exclude the additional installation of a conventional upper roof.

The construction in accordance with this invention is especially suited in contrast to known constructions. For example in accordance with U.S. Pat. No. 3,719,244, owners of very small motor vehicles with relatively small loading area or motor cars with loading areas find it is difficult to install a high mounting or addition, especially one that guarantees standing room. In this invention, one only has to devise a recess in the loading surface behind the cab which can be closed after the removing of the camping mounting by means of a lid or the like.

All other known solutions add to the height of the vehicle in contrast to this invention and its solution (see, for example, U.S. Pat. Nos. 3,736,019; 3,489,454; 3,659,894). The space below the load platform of so called pick-up trucks is not utilized in the known solutions.

The tub-like depression of this invention immediately adjacent to the cab considerably facilitates entrance into the interior of the camping mounting from the cab since the person's legs can immediately be stretched downwards, so that the person can reach the living space from the cab of the motor vehicle essentially in an upright posture.

The upper edge of the depression is preferrably equipped with pads for seating.

The invented construction is especially advantageous for a vehicle with a closed load space immediately behind the cab and under the load surface (for example on VW light carriages). In this case the tub-like depression extends into the load space where preferrably the bottom of the load space forms the bottom of the depression. This, however, does not have to be so if the downward extending depression is formed by a closed tub which is fitted to the bottom of the camping mount or which is fastened in a removable manner.

The cabs of very small vehicles, station wagons, back-seat wagons, which are suitable for the described camping additions, are generally equipped with benches for seating. Such a bench makes it difficult to enter into the living space from the cab. The cab therefore would have to be equipped with single seats spaced relatively far apart from one another to obtain an easier access to the living space. The space between the two individual seats must be kept open to reach the living space from the cab and vice versa while the vehicle is being driven. It is disadvantageous however that this space between the two individual seats is lost space, especially because a third person cannot be seated in the cab. These disadvantages can be avoided in a motor vehicle while maintaining a passageway from cab to the living space between the driver and passenger seats by placing the driver and passenger seat sufficiently away from one another so that a third seat can be installed between them, and providing a third seat that is a folding seat which can be pushed or moved behind the driver and passenger seats; that is, between them and the back wall. This seat design, of course, can not only be used in a vehicle with the above described camping addition, but can generally be used for mobile homes with cab and living space and with a passageway from cab to living space.

The seating arrangement of the invention also elegantly connects the advantages of the seating bench with the advantages of individual seats. At least three persons can sit next to each other in the cab where simultaneous side restraint for the passenger and the driver is guaranteed by proper design of the individual seats. Especially during traffic accidents it has been shown that the seats which lack side restraints have resulted in injuries which otherwise could have been avoided. These disadvantages can be avoided in a simple way by means of the invented seat arrangement.

Preferrably the driver seat as well as the passenger seat are contour seats with side pads on seat and back.

In this respect it is preferred that the side pads be of a symmetric cross section so that the third seat, that is the center seat, when in use has the comfort of the contoured seat.

The claims given below describe in more detail the preferred constructive development regarding the camping addition and the connection with the motor vehicle in accordance with the seat arrangement of this invention.

BRIEF DESCRIPTION OF THE DRAWINGS

The following are preferred embodiments of the invention which are described using the attached drawing for fuller description. Shown in the drawings is:

FIG. 4. A seat arrangement in the cab of a vehicle with camping addition in accordance with FIG. 1 through FIG. 3.

DESCRIPTION OF THE ILLUSTRATED EMBODIMENT

Figure 1:
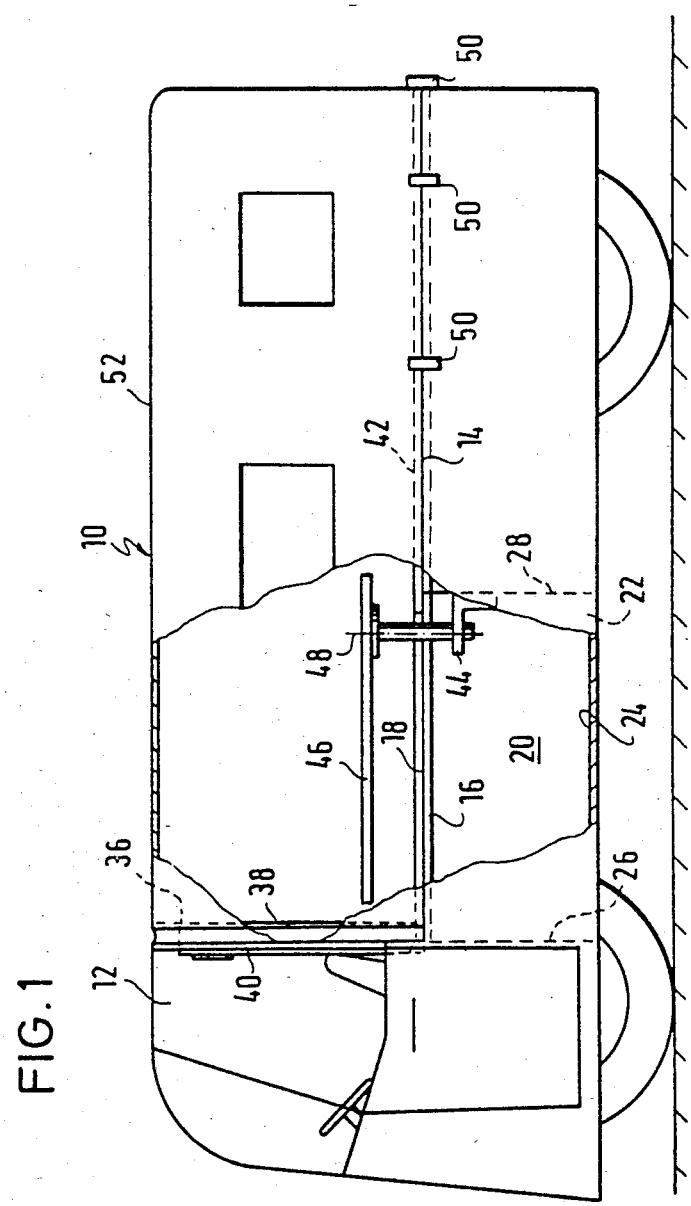
FIG. 1. A vehicle with a camping addition in side view, with a partially removed side wall.
Figure 2:
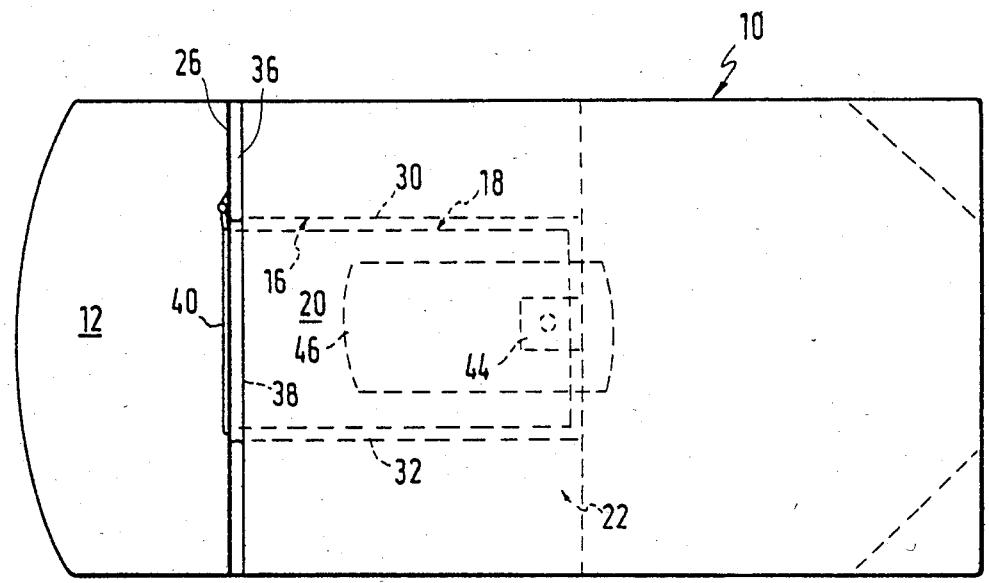
FIG. 2. A top view of the vehicle with camping addition shown in FIG. 1.
Figure 3:
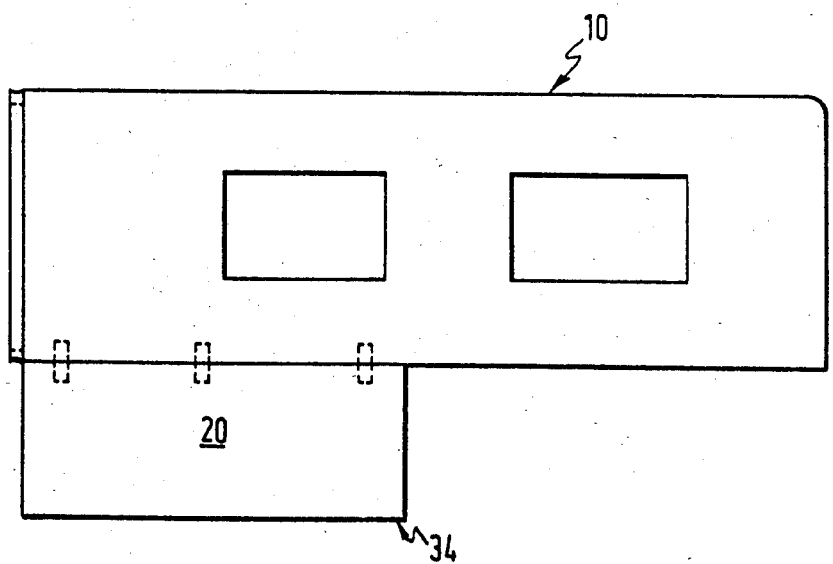
FIG. 3. A different embodiment of a camping addition.

In FIGS. 1 and 2 a motor-powered transporter, that is pick-up wagon, with cab 12 and a load area 14 is schematically shown on which is attached a camping addition 10 by means of buckle connectors 50 to form a living space. The camping addition 10 is approximately in the form of a square configuration in the portion of addition 10 where the roof 52 connects to the roof of cab 12. The bottom 42 of the camping addition 10 lies on load surface or platform 14 of the transporter. Preferrably, vibration dampers are installed between the underside of the addition 10 and the load platform which keep the living space or the camping addition 10 relatively free of vibrations.

It is preferred that the side walls and the rear wall of the loading platform are removed before fastening of the camping addition 10. Then the fastening of the camping addition 10 can be done by means of the hinges of the walls of the loading platform.

The transporter shows in FIGS. 1 and 2, a load space 22 which is closed and which is immediately behind the cab and under the load platform, being accessible from side doors. As shown in FIG. 2, loading surface 14 above load space 22 has an opening 16 which approx. corresponds to an opening 18 in the bottom 42 of camping addition 10. This creates in the area of opening 16 a free space which extends downward and which is incorporated in the interior or the living space of camping addition 10. Between the upper edges of load surface opening 16, extending in the longitudinal direction of the vehicle and the bottom 24 of load space 22, are installed side walls 30, 32. These two side walls 30, 32 as well as the rear cab wall 26 and across from it a border wall 28 of the load space 22 form an approximate tub shaped recess. Sufficient space for luggage or loading space remains between side walls 30 and 32 and the outer walls of the vehicle. It is preferred that side walls 30 and 32 are fastened in such a way that they can be removed so that the full load space 22 is available during the normal use of the transporter. During such normal use, the opening 16 in the load surface 14 is closed by means of a lid.

A door 40 is provided in the rear cab wall 26 while there is a corresponding opening 38 in the closure wall 36 adjacent to the rear cab wall 26, so that one can reach the interior of the camping addition from the cab through door 40 and opening 38. Opening 38 and door 40 are arranged above recess 20 which gives easy entrance into the interior of camping addition 10. If the floor of the cab is correspondingly low, opening 38 and door 40 can be extended approximately to floor 24 of load space 22. Door 40 is not absolutely necessary. By deleting door 40 one obtains a comfortable passageway between cab and living space, that is the interior room of the camping addition 10.

The embodiment in accordance with FIG. 1 shows a door 40 which extends approx. from load surface 14 almost to the roof of cab 12.

Instead of a door a lid can be provided, which can be easily removed. The lid is removed for use of camping addition 10 so that there always is present a passageway between cab 12 and camping addition 10.

Between rear cab wall 26 and the adjacent closure wall 36 of camping addition 10, there is arranged an air and water tight elastic seal strip at least around opening 38. Elasticity is required to balance relative motion between cab 12, that is the vehicle, and camping addition 10, especially during travel.

The rear closure wall of camping addition 10 can have an additional access hatch or the like. This, however, is not necessary since entrance into the camping addition 10 should only occur from the cab. However, the access hatch is recommended for safety reasons.

A bracket 44 is attached to the rear wall 28 of load space 22 which carries a table 46 that can be pivoted about vertical axis 48. Table 46 preferably is dimensioned in such a way that it can be used simultaneously as the cover for opening 16 of load surface 14. The upper edge of opening 18 in floor 42 of the addition 10 is preferrably equipped with seat pads which allows comfortable sitting around table 46. The person's legs can be stretched into recess 20. In the area of recess 20 the camping addition almost allows standing height. This is obtained by extending the interior space of camping addition 10 downward rather than upward by means of an elevated roof or the like which has been the practiced until now.

For vehicles which do not have a closed load space behind the cab underneath the load surface, camping addition 10 has a box (tub) 34, which is open on top and which corresponds to depression 20. The box 34 is fastened to bottom 42 of camping addition 10 by means of quick disconnect fasteners. The box, that is tub 34, can also be formed in one piece on bottom 42. The box 34, is then passed through opening 16 of load surface 14. Should there be a drive shaft underneath the load surface in the way of installation of the box or tub 34, box 34 can generally be equipped with a central drive shaft tunnel.

The box or tub 34 can be arranged in the form of an extension. In that case the side walls, namely also the front and rear side walls of the tub-like depression, can be formed by means of canvas or other folding material.

The conventional elevated roof can be installed in roof 52 of the camping addition in order to obtain even a larger height in the interior space of the addition 10.

Cab 12 is schematically shown in FIG. 4, mostly in a cut-out view so that one can see into the interior 88 of the cab. Living space 10 is indicated by dotted lines, and for example, can be a camping addition in accordance with the above description.

Passage way (opening 38) is provided in rear cab 26 which allows access to living space 10 through cab 12 and vice versa. The passageway extends almost over the entire height of the cab. On each side of the passageway is an individual seat, namely driver seat 54 and passenger seat 56. Both seats are supported on floor rails 84, 86 which run along the direction of travel of the vehicle so that the seats can be moved along these rails. Behind passenger seat 56, that is between its back rest 82, is a third seat, namely a folding seat 58. The seat pad 72 of this third seat is mounted on hinge 74 and folded against the back pad. This third seat can be pushed between the driver seat and the passenger seat along guide rails 60, 62 which extend perpendicular to the direction of travel of the vehicle. In this position seat pad 72 is folded downward between seats 54 and 58 and is supported by frame sections 76, 78 pertruding from frame 66 of seat 58 over guide track 62 which extends in the direction of travel. In the folded down position, seat pad 72 assumes approximately a horizontal position. Referred to frame 66 is equipped with guide elements 68, 70 which work together with guide rail 60, 62. The guide element 68, 70 can be in the form of slide bearings.

It is also possible to equip guide elements 68, 70 with ball bearings, so that the third seat 58 is supported on guide rail 60, 62 by means of ball bearings. This makes it considerably easier to store or retrieve third seat 58.

For retrieval or storage of the third seat 58 it is preferred that the passenger seat 58 is displaced along the floor rails 84, 86 somewhat to the front and in the direction of vehicle travel so that the third seat 58 is not hindered by back rest 82 of passenger seat 56. In the storage position passenger, seat 56 is pressed with its back rest 82 against the underside of seat pad 72, so that third seat 58 is fixed in its stored position. The width of seat pad 72 and/or back pad 64 of third seat 58 is preferrably chosen in such a way that they essentially correspond to the space between passenger and driver seats. This way third seat 58 is well secured in its use position. However, additional manual means of securement such as clamps on guide rails or the like can be provided.

As FIG. 4 shows, one guide rail 62 is fastened to cab floor 80 while the other guide rail 60 is fastened to cab rear wall 26. However, it is also possible to attach guide rail 62 as well to the cab rear wall with broken spacing from guide rail 60. It is only essential that both guide rails are a certain distance from one another and that they are parallel to one another so that jamming or twisting is avoided when the third seat 58 is retrieved or stored. Where both guide rails 60, 62 are fastened to cab rear wall 26, the seat pad is preferrably supported in its unfolded position at least by one strut which upon unfolding of the seat automatically extends and forms a support on cab floor 80. It is, of course, also possible to arrange the connection or the link 74 in such a way that it also serves as a support element. Such links are generally known.

In the example of FIG. 4, the passenger seat 56 as well as the driver seat 54, each are formed as contour seats, including a seat pad and back pad 90, 92. This guarantees that the third seat 58 when it is positioned between driver and passenger seat, has contour type properties, although itself is not equipped with side protruding seat and back pads. In order to increase the comfort of the third seat 58, at least the adjacent seat and back pads 90, 92 should be symmetric in cross section respectively, and preferably of a pointed shape. The latter form not only results in more comfort for all three people seated in the cab but it also is a considerable improvement in side stability and hence will reduce injuries in the case of accidents.

It should be further explained that the back rest of driver seat 54 is identified by reference number 84 and that the right front wheel of the only partially shown vehicles is identified with reference number 94. The driver's door is identified with reference number 96.

A third seat 58 can be arranged that it is somewhat set back relative the two individual seats 54, 56. This may be especially true when constructed in such a way that it can be swivelled from the interior of living space 10 into the space between the individual seat 54, 56, namely around a vertical and upright axis.

It should be pointed out in conclusion that in the case of a vehicle with somewhat smaller load area and larger passenger space, that is larger driver cab, the camping that is the pick-up addition can preferably be extending beyond the rear end of the load platform or the rear dimension of the vehicle and can simultaneously be extended downward. This gives additional living space. Further, entrance into the living space of the camping addition from the rear is extremely facilitated.

In order to obtain equal axle loading in the latter case, the camping space is extended forward over the roof of the cab in well known fashion. In the sideview the camping addition has then an approximate U-shaped contour with an extension of the bar forward. This extension is the part of the camping space arranged over the roof of the camp. Between the two parallel parts of the U-shape of the addition is located the rear axle and possibility the engine compartment of the vehicle (for example VW transporter with a rear engine).

I claim:

1. In combination, a motor vehicle having a cab with a back wall and a cab floor in a substantially horizontal plane and at leat one seat secured to said floor and a load platform located behind said cab and substantially above the level of said cab floor, said load platform having an opening immediately adjacent the cab and extending rearwardly from said cab, a camping addition means adapted to be releasably fastened on said load platform of the motor vehicle, said camping addition means having a bottom opening which in the mounted condition is aligned with said opening in the load platform of the vehicle immediately adjacent the cab, said camping addition means having a tub-like depression means having an addition floor secured to said bottom opening by sidewall means in the camping addition means and said sidewall means extending beneath said platform to said addition floor, said addition floor being substantially in the same horizontal plane with said cab floor of said cab and forming an increased height for standing in the interior of the addition means and defining a living space in the area of said openings as a rearward extension of said cab, said cab having an opening in said back wall aligned with said tub-like depression means to form a substantially continuous living space between said cab and said addition.

2. The combination of claim 1 wherein said motor vehicle includes rear wheels spaced from said cab and supporting the rear portion of said vehicle, and said platform being located above the rear wheels and having a rear portion overlying said rear wheels, and said tub-like depression means located between the cab and said rear wheels of the motor vehicle.

* * * * *